Jan. 16, 1962                 F. PAPKE                 3,016,786
RANGE FINDER FOR PHOTOGRAPHIC CAMERAS
Filed Nov. 23, 1959                               2 Sheets-Sheet 1
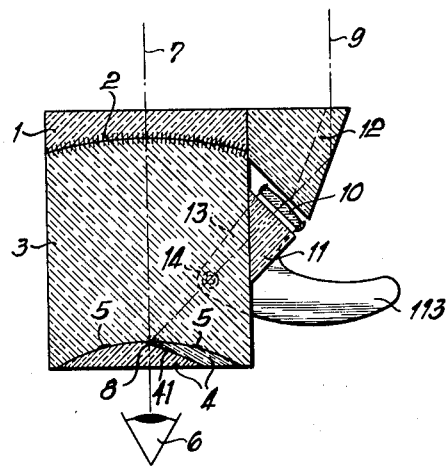
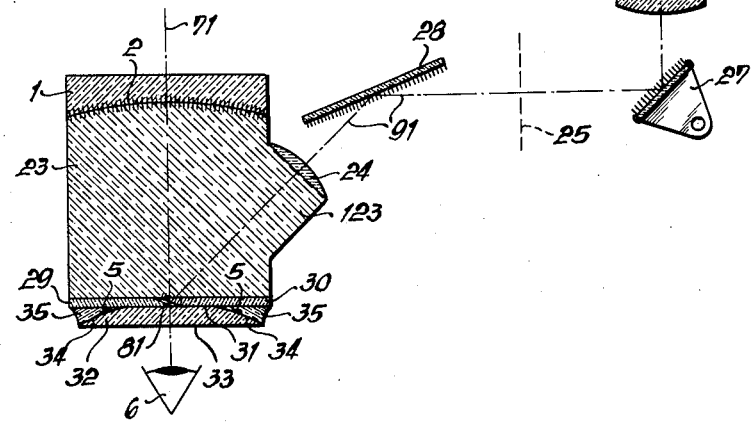
INVENTOR
Friedrich Papke
By Blum, Moscovitz, Friedman & Blum
Attorneys Jan. 16, 1962    F. PAPKE    3,016,786
RANGE FINDER FOR PHOTOGRAPHIC CAMERAS
Filed Nov. 23, 1959    2 Sheets-Sheet 2

INVENTOR
Friedrich Papke
By Blum, Moscovitz, Friedman & Blum
Attorneys

3,016,786
RANGE FINDER FOR PHOTOGRAPHIC CAMERAS
Friedrich Papke, Braunschweig-Gliesmarode, Germany, assignor to Voigtländer A.G., Braunschweig, Germany, a corporation of Germany
Filed Nov. 23, 1959, Ser. No. 854,934
Claims priority, application Germany Nov. 22, 1958
11 Claims. (Cl. 88—2.4)

This invention relates to a range finder for photographic cameras and it has particular relation to range finders comprising a view finder based on the Albada principle combined with a telescope providing a real image of the measuring rays of the range finder.

It has been suggested previously to provide a range finder, combining a view finder, producing a virtual image, with a telescope, producing a real image, the parts being so arranged as to provide, in the plane of the real image, a sharply delineated outline of the reflected real image. Such a range finder operates as a base range finder, with simultaneously viewing of the virtual image and the real image which are brought into coincidence and the distance or "range" measured on a suitable scale which indicates the amount of adjustment necessary to achieve coincidence of the two images.

This known range finder is designed as a measuring finder with viewing of the two images through the same sight and, in such a range finder, there is provided, in addition to the reflection of the images, a reflection of the border of the image frame. In effect, this known range finder is a "Newton" finder including a telescope providing a real image and wherein erection of the image is obtained by conventional optical means such as pentaprisms, roof or triangular prisms, or "Dove" prisms. Reflection of the border of the image frame is provided by a partially light permeable plane mirror adapted to reflect the image through other optical members generally having positive refractive powers. While effective in operation, known range finders of this type have been very considerably expensive due to their large number of relatively expensive optical parts and their complicated inter-relation of these parts.

In accordance with the present invention, range finders or view finders, of the type including a telescope providing a real image and in which reflection of the image frame border is based on the Albada principle, are provided in a simple and inexpensive manner and, in the preferred embodiment, using a magnification ratio of 1:1. More particularly, in accordance with the present invention, there is arranged, substantially on the optical axis of the finder and on a frame carrying surface located in the focal plane of the partially light-permeable mirror, an inclined mirror which directs the measuring rays entering through the telescope along the optical or sighting axis of the finder. The arrangement is such that the image provided by the measuring rays, and the inclined mirror, are imaged by the partially light-permeable mirror at about infinity.

The appended drawings illustrate by way of example some specific embodiments of and best modes for carrying out the invention, to which the invention is not limited.

In the appended drawings:

FIG. 1 is a horizontal sectional view, somewhat schematic, through a measuring finder embodying the invention;

FIG. 1b is a view similar to FIG. 1a illustrating a modification of the detail shown in FIG. 1a;

FIG. 2 is a view similar to FIG. 1 illustrating another embodiment of measuring finder in accordance with the invention;

FIG. 2b is a plan view corresponding to FIG. 2a.

Figure 1A:
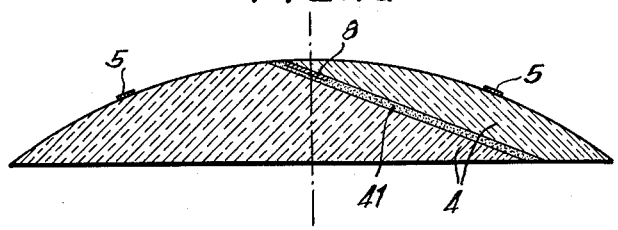
FIG. 1a is a horizontal sectional view illustrating a detail of FIG. 1 to a much larger scale.

Referring to the drawings in detail, in the embodiment of the range finder shown in FIG. 1, the viewfinder proper comprises a plano-concave lens 1 having its concave surface carrying the partially light-permeable mirror 2 such as used in an Albada finder. The glass body 3 has a convex surface at one end concentric with the concave surface of lens 1, and this convex surface is cemented to such concave surface. A partial filler of cement having the same index of refraction as that of body 3 may be used. Body 3 has a concave surface at its opposite end, to which is cemented the coaxial convex surface of a frame carrier 4. The frame 5 to be reflected, as in an Albada finder, is seated in the cementing layer between glass body 3 and frame carrier 4. The plane rear or outer surface of frame carrier 4 is, in use of the range finder, turned to an eye of the user, as indicated at 6, for sighting along axis 7.

In accordance with the invention, a small reflecting mirror 8 is seated on the convex surface of the frame carrier substantially on the optical axis 7 of the viewfinder. Mirror 8 is inclined to such a degree that it will reflect the measuring rays 9, entering through the telescope portion of the range finder, along the optical or sighting axis 7. Furthermore, mirror 8 is located in the focal plane of the concave mirror 2 as well as being located in the focal plane of lens 10, which latter is the objective of the telescope providing the real image. This telescope includes the lens 10 and the concave mirror 2, with the parts related in such a manner that mirror 8 lies in the plane of the real image and the border of mirror 8 represents the diaphragm in this particular plane.

Between body 3 and lens 10 there is a prism 11 which either may be a separate prism cemented to body 3 or may be formed integrally with the body 3. The measuring rays 9 enter a prism 12 in a direction substantially parallel to optical axis 7. Prism 12 deflects these measuring rays through the lens 10 and prism 11 into body 3 and to mirror 8.

The lens 10 is mounted on a lever 13 pivoted at axis 14 and operable by a handle 113. Handle 113 is adjusted, in using the range finder, until the real image received through the prism 12 appears in coincidence with the subdivided or split virtual image reflected by mirror 2. The position of handle 113, when the images are in coincidence, is a measurement of the "range" or distance.

Instead of the prism 12, a system of prisms and/or mirrors can be mounted in the path of the rays 9, so that the base of the range finder can be lengthened to a desired extent in a conventional manner, and erection and reversal of the real image effected in a different conventional manner. Furthermore, an additional lens or mirror system can be interposed, in the same manner as in a terrestrial telescope, for erecting the real image.

Such an arrangement is illustrated in FIG. 2. In the latter, reference symbol 1 denotes again the plano-concave lens of the finder with the partially permeable mirror 2, to the concave surface of which is cemented the convex surface of a glass body 23 having a prism 123, corresponding to prism 11, formed integrally therewith. A lens 24 is cemented to an end surface of prism 123 and functionally corresponds to the lens 10 in FIG. 1. However, lens 24 does not form an image of the object proper, but of the intermediate image 25, which is produced by lens 26 over angularly adjustable mirror 27. A second mirror 28 deflects the measuring rays 91 to enter through lens 24 into the body 23. There is thus provided a terrestrial telescope comprising of the lenses 26 and 24 and the partially permeable mirror 2, which latter has the function of an ocular, while the lens 26 has the function of an objective and lens 24 performs the function of the reversing system of the telescope. A mirror 81, corresponding to the mirror 8 of FIG. 1, is arranged on the optical finder axis 71 and, as in the case of mirror 8, has the function of representing the real image plane and its diaphragm. A significant feature of the embodiment shown in FIG. 2 is the particular design and arrangement of mirror 81, which can be used also in the embodiment according to FIG. 1. Specifically, two parallel surfaced glass plates 29 and 30 are cemented on the plane rear face of body 23 and have mating bevelled inner edges which are slightly spaced. Plate 30 carries, on its bevelled edge, the narrow mirror 81, and the two plates are so arranged that their mating or parallel bevelled surfaces form only a very narrow cementing groove.

A lens-like member 32 is cemented to the outer surface 31 of the plates 29 and 30, this member having a substantially uniplanar outer surface 32 which forms the sight of the finder. The inner surface of member 32 is in two parts. The mdidle part of this surface is plane and preferably parallel to surface 33. The marginal surface is annular and preferably spherical, and carries the frame 5 to be reflected, like lens 4 in FIG. 1. The space between plane surface 31 and spherical surface 34 of member 32 is filled by adhesive cement 35 which has the same index of refraction as that of the member 32. Consequently, the combination of member 32 and the filling cement 35 results in there being no lens effect relative to the optical parts arranged in advance of the member 32. Depending on the details of the arrangement shown in FIG. 2, the position of mirror 81 should be selected in such manner that the desired deflection of the measuring ray 91 is brought about. Normally, mirror 81 has an inclination of 65° relative to the optical axis 71. In connection with FIG. 2, it should be noted that the frame 5 to be reflected does not necessarily have to be arranged on a spherical surface. The carrier surface can, in some cases, be uniplanar. In such a case, the optical element consisting of the lens-like member 32 and cement 35 could be replaced by a plane parallel surfaced glass plate, which carries frame 5 on its inner surface which is cemented to surface 31. Another structural simplification consists in arranging the frame 5 on the eye facing surface of the intermediate finder part 23 so that the frame would be protected between the uniplanar end surface of member 23 and the glass plates 29 and 30. In such a case, there would be no need for further optical elements outwardly of the plates 29 and 30. In cases where a cover for frame 5 is not necessary, the frame can be arranged, in the manner described above, on the surface 31 of the plates 29 and 30, and this surface can then constitute the sighting surface for the finder.

It has been found suitable to select the dimensions of the inclined mirror 8, 81 for the measuring ray 9, 91 of the range finder in such a range that its length and height respectively lie between 1/10 and 1/20 of that of the finder.

Figure 1B:
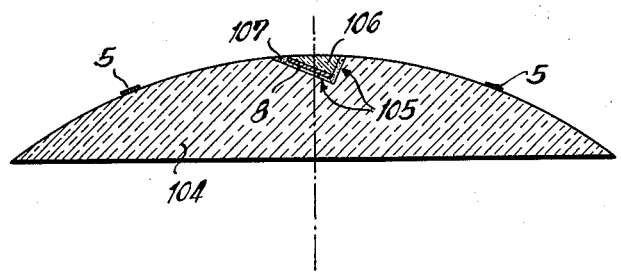
Figure 2A:
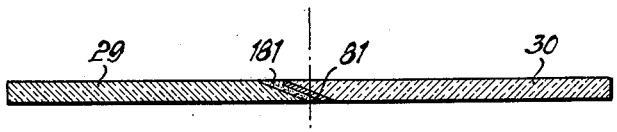
FIG. 2a is a horizontal sectional view illustrating a detail of FIG. 2 to a greatly enlarged scale.
Figure 2B:
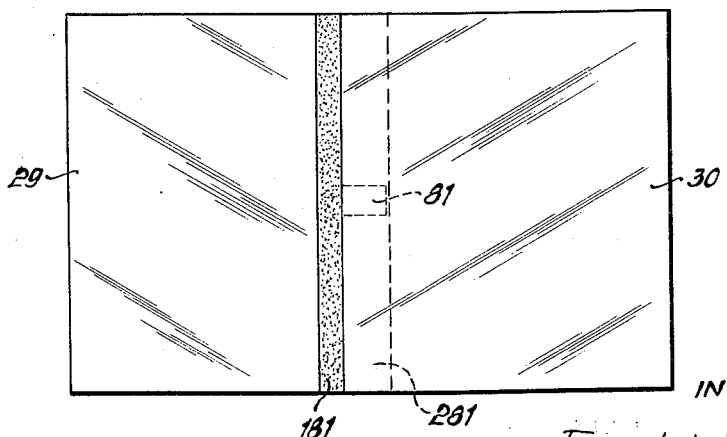

FIGS. 1a, 1b, and 2a, 2b illustrate details of the arrangement shown in FIGS. 1 and 2, and modifications thereof, to an enlarged scale in order to clarify certain features of the invention.

FIG. 1a shows the frame carrier 4 and frame 5 of FIG. 1, and illustrates the mirror 8 as located in the cement layer 41.

In the modified arrangement shown in FIGS. 1b, the frame carrier 104 is provided with a small prismatic recess 105 into which is cemented a correspondingly shaped prismatic glass part 106. One surface of part 106 carries the mirror 8, and the curved surface of part 106 has the same radius of curvature as that of the remainder of the frame carrier 104 and is a continuation of the latter. The reference numeral 107 indicates the cement securing parts 104 and 106 to each other.

FIG. 2a illustrates, on a much larger scale, the plates 29 and 30 and the mirror 81 arranged within the layer of cement uniting the bevelled mating surfaces of these plates, the cement being indicated at 181.

FIG. 2b is a plan view, likewise to a larger scale, of the arrangement shown in FIG. 2a, and amounts to a view looking along the axis of the finder. The zone of overlap of plates 29 and 30 is indicated at 281, this being the zone where the mating bevelled surfaces are cemented together. Mirror 81 extends through the full width of the zone 281, having its length extending in the direction of the width of zone 281. In this particular instance, the area of the mirror 81 amounts to about 1/12 of the area of the inside opening of the finder.

It will be understood from the above that this invention is not limited to the specific designs, constructions, materials, steps and other details specifically described above and illustrated in the drawings and can be carried out with various modifications without departing from the scope of the invention as defined in the appended claims.

What is claimed is:

1. A measuring finder for photographic cameras comprising, in combination, a viewfinder providing a direct image of the object and including a semi-light permeable mirror and a frame arranged in the focal plane of said mirror for reflection thereby at substantially infinity; a telescope adapted to provide a real measuring image from light rays entering the telescope along an object viewing axis spaced laterally along the base of the measuring finder from the optical axis of said viewfinder, and including an objective; a reflecting mirror arranged substantially on the optical axis of the viewfinder in the focal plane of said semi-light permeable mirror and facing the latter, and inclined relatively to said optical axis; said reflecting mirrow being imaged at substantially infinity by said semi-light permeable mirror; and ray directing means operatively associated with said telescope and adjustable to direct the measuring image rays incident through said objective to said reflecting mirror; whereby, upon adjustment of said ray directing means, the two images respectively provided by said viewfinder and said telescope may be brought into substantial coincidence in the focal plane of said semi-light permeable mirror.

2. A measuring finder as claimed in claim 1 including an image erecting member arranged in advance of said reflecting mirror in the path of the measuring image rays entering the telescope.

3. A measuring finder as claimed in claim 1 including an angularly adjustable reflecting member arranged in advance of said reflecting mirror in the path of measuring image rays entering said telescope.

4. A measuring finder as claimed in claim 1, in which the area of said reflecting mirror is from 1/10 to 1/20 of the area of the insight surface of the viewfinder.

5. A measuring finder as claimed in claim 1, in which said viewfinder includes a front lens having a concave inner surface, a frame carrying member, and a transparent intermediate body located between said frame carrying member and said lens, said lens having its concave surface cemented to a mating convex end surface of said body, and said frame carrying member being integrated with the opposite end surface of said intermediate body; said semi-light permeable mirror being arranged between the adjacent surfaces of said lens and said intermediate body; and a supporting element for said reflecting mirror cemented to such opposite end surface of said intermediate body.

6. A measuring finder as claimed in claim 5 in which said supporting element comprises said frame carrying member.

7. A measuring finder as claimed in claim 5 in which said supporting element comprises a pair of transparent components having facing parallel surface portions extending at an angle to the optical axis of said viewfinder and defining a slot therebetween; said reflecting mirror being positioned in said slot defined by said parallel surface portions and being held in position by cement uniting said components to form a composite supporting element.

8. A measuring finder as claimed in claim 5 in which said frame carrying member is a plano-convex member having its convex surface united to a mating concave surface on such opposite end of said intermediate body; said frame carrying member also constituting said reflecting mirror supporting element; said frame carrying member being formed of a pair of components conjointly providing said member, said components having facing parallel surface portions obliquely intersecting the optical axis of the viewfinder and extending thereacross to define a slot for receiving said reflecting mirror; said reflecting mirror being disposed in such slot and held in position by cement uniting said components to form said frame carrying member; the frame being carried by the convex surface of said frame carrying member.

9. A measuring finder as claimed in claim 5 in which said frame carrying member is a plano-convex transparent member having its convex surface cemented to a concave surface on such opposite end of said intermediate body; said frame carrying member further constituting said reflecting mirror supporting element; said frame carrying member having a recess in its convex surface located on the optical axis of the viewfinder and including a surface extending obliquely to and across said optical axis and a second surface outwardly at right angles to said first mentioned surface; said reflecting mirror being positioned along said first mentioned surface; and a complementary piece of transparent material overlying said reflecting mirror and having an outer surface constituting a continuation of the convex surface of said frame carrying member; said complementary piece being cemented in position with the cement holding said reflecting mirror in position, to form a unitary frame carrying and reflecting mirror supporting unit; the frame being carried by the convex surface of said frame carrying member.

10. A measuring finder as claimed in claim 5 in which said reflecting mirror supporting element comprises two plane parallel surfaced plates having parallel inclined end surfaces at their adjacent ends at substantially the optical axis of the viewfinder, and extending across the optical axis and forming a narrow groove in which said reflecting mirror is positioned by cementing; said plates forming a plane parallel optical element of the finder integral with said intermediate member and said frame carrying member and disposed therebetween.

11. A measuring finder as claimed in claim 10 in which said frame carrying member is a transparent element having an outer uniplanar eyefacing surface; the inner surface of said member including an intermediate uniplanar surface portion in engagement with a plane surface of said plates, and spherical surface portions extending from said intermediate surface portion; said frame being positioned on the inner surface of said member; the free space between said member and said optical element being filled with a cement having the same refractive index as that of said frame carrying member.

No references cited.